BURLEIGH H. LEACH
HERMAN P. NOWAK
*INVENTORS*

BY *Joseph C. Ryan*
ATTORNEY

BURLEIGH H. LEACH
HERMAN P. NOWAK
INVENTORS

BURLEIGH H. LEACH
HERMAN P. NOWAK
INVENTORS

ATTORNEY

United States Patent Office 3,105,585
Patented Oct. 1, 1963

3,105,585
BULB ORIENTING APPARATUS
Burleigh H. Leach, Hamilton, and Herman P. Nowak, Danvers, Mass., assignors to Sylvania Electric Products Inc., a corporation of Delaware
Filed Apr. 30, 1962, Ser. No. 191,159
6 Claims. (Cl. 198—33)

This invention relates to the manufacture of electric lamps and the like, and more particularly to the automatic orientation and feeding of bulbs during the lamp manufacturing operations.

In the manufacture of electric lamps and the like, more particularly incandescent electric lamps, bulbs and mounts are usually presented to heads of a lamp sealing machine on which these two work components are sealed to one another to define a hermetically sealed lamp envelope. Heretofore, automatic transfer devices have been developed and utilized to effect the feeding or transfer of certain types of mounts and bulbs to the heads of the lamp sealing machine. For example, an automatic bulb orienting and feeding apparatus is disclosed in U.S. Patent 2,917,169 which issued on December 15, 1959, to Donald L. Kingston et al. The apparatus disclosed in that patent is designed primarily for use with bulbs having a cullet or skirt diameter less than the major diameter of the bulb. In the apparatus disclosed in that patent, advantage is taken of the fact that the skirt diameter is less than the major bulb diameter and the bulbs are oriented with the open end down as the bulbs move along a track.

The problem with which we have been confronted is to provide an apparatus which will make possible the automatic orientation and feeding of bulbs having a skirt diameter equal to or greater than the maximum bulb diameter. The apparatus disclosed in the patent mentioned above cannot readily be employed to perform these operations on bulbs of this type.

In view of the foregoing, one of the objects of this invention is to provide an apparatus for automatically orienting and feeding bulbs.

Another object of this invention is to provide an apparatus for orienting and feeding bulbs having a skirt diameter equal to or greater than the major bulb diameter.

A further object of this invention is to provide a bulb orienting and feeding apparatus in which a conveyor moves through a supply of bulbs randomly disposed therein and carries them through a path along which the bulb orienting components of the apparatus of this invention are disposed.

Further objects, advantages and features of this invention are attained in accordance with the principles thereof by providing a pair of bulb orienting components of a bulb orienting apparatus astride the path traversed by a bulb conveyor. Each of these bulb orienting components comprises a conveyor with a plurality of bulb orienting heads mounted thereon and carried thereby. These two conveyors which carry the bulb orienting heads and the bulb conveyor are advanced synchronously so that during a portion of their travel the bulb orienting heads engage the bulbs horizontally disposed on the bulb conveyor, remove the bulbs therefrom and effect a vertical disposition thereof. The vertically disposed bulbs are then presented at a discharge locus to a track system which in turn delivers the uniformly oriented bulbs to the next unit of bulb processing or lamp manufacturing equipment. The bulb conveyor is provided with a plurality of pockets or compartments, each of which normally carries a pair of bulbs from the bulb supply or bin. As will be more fully appreciated from the detailed description below, the bulb orienting heads are so constructed and so arranged that the bulb orienting operation may be performed effectively and satisfactorily whether there is one or two bulbs in each pocket or compartment of the bulb conveyor and regardless of the initial orientation of the bulbs in the pockets or compartment as they are advanced to the bulb orienting components of the apparatus.

In the specific embodiment of the invention illustrated in the accompanying drawings, FIGURE 1 is an elevational view of a bulb orienting apparatus and the major components associated therewith, viz., a bulb conveyor which carries bulbs from a supply thereof to the bulb orienting apparatus, a track system to which the bulb orienting apparatus delivers oriented bulbs and a conveyor system which receives oriented bulbs from the track system.

Figure 1:
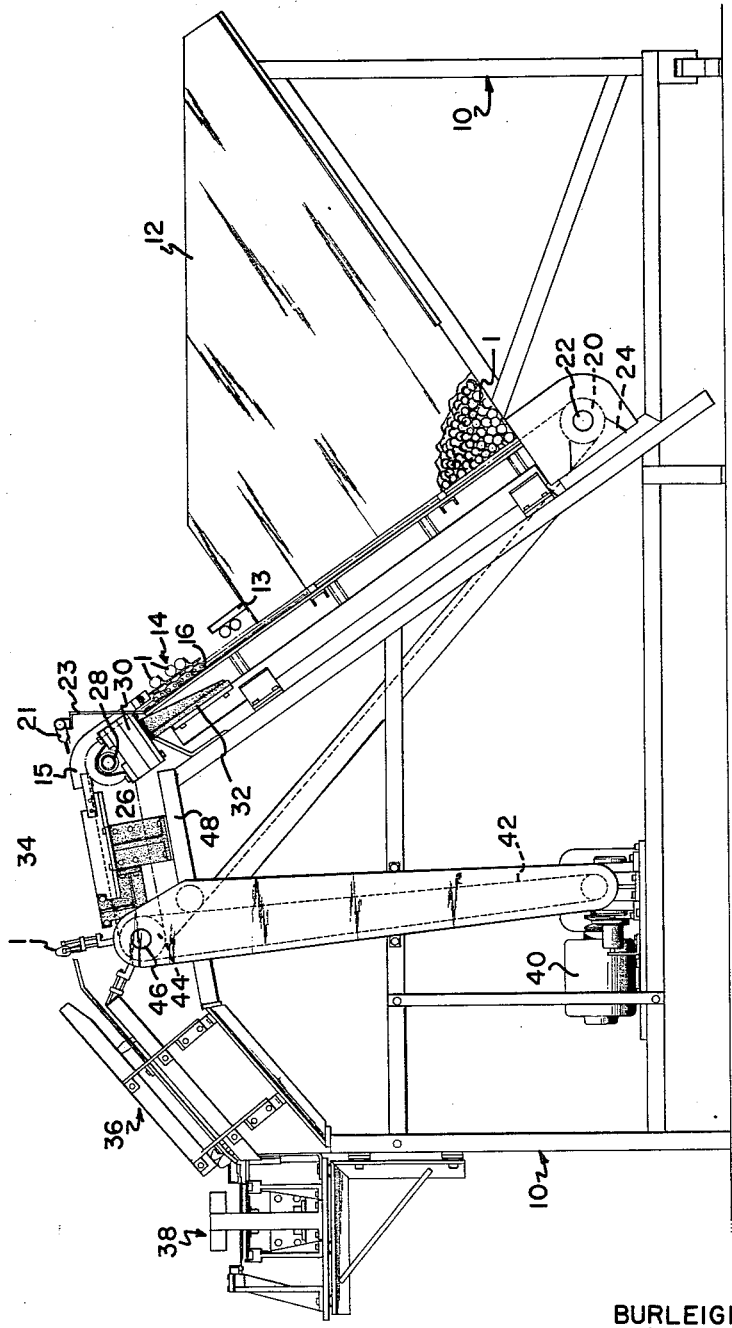

Referring now to the drawings, particularly FIG. 1 thereof, the apparatus of this invention is organized about a framework 10. A bulb bin 12 is supported on the framework 10. A bulb conveyor 14 moves through the bin 12 and carries bulbs 1 therefrom. The bulb conveyor 14 comprises a chain 16 on which a plurality of bulb supports 18 and 19 are secured. The bulb supports 18 are plate-like members and the bulb supports 19 are angle iron members. The chain 16 meshes with a sprocket 20 on an idler shaft 22 supported by pillow blocks 24 attached to the framework 10 immediately beneath the bulb bin 12. The chain 16 also meshes with a sprocket 26 on idler shaft 28 supported by pillow blocks 30. As is shown in FIG. 1, each pillow block 30 is mounted on a bracket 32 attached to the framework 10.

The bulb conveyor 14 carries the bulbs 1 supported thereon through a bulb orienting apparatus identified by the general reference number 34 in FIG. 1. After the bulbs 1 have been oriented by this bulb orienting apparatus 34 as described in detail below, they are delivered to a track system identified by the general reference number 36 in FIG. 1. Bulbs 1 emerging from the track system 36 are received by another unit of bulb processing or lamp manufacturing equipment. As shown in FIG. 1, the bulbs 1 emerging from the track system 36 are received by a bulb conveyor system 38 supported on the framework 10 and are carried thereby to lamp sealing machine. The bulb conveyor 14 is driven by a motor 40 through drive chain 42 which meshes with drive sprocket 44 on drive shaft 46.

Figure 2:
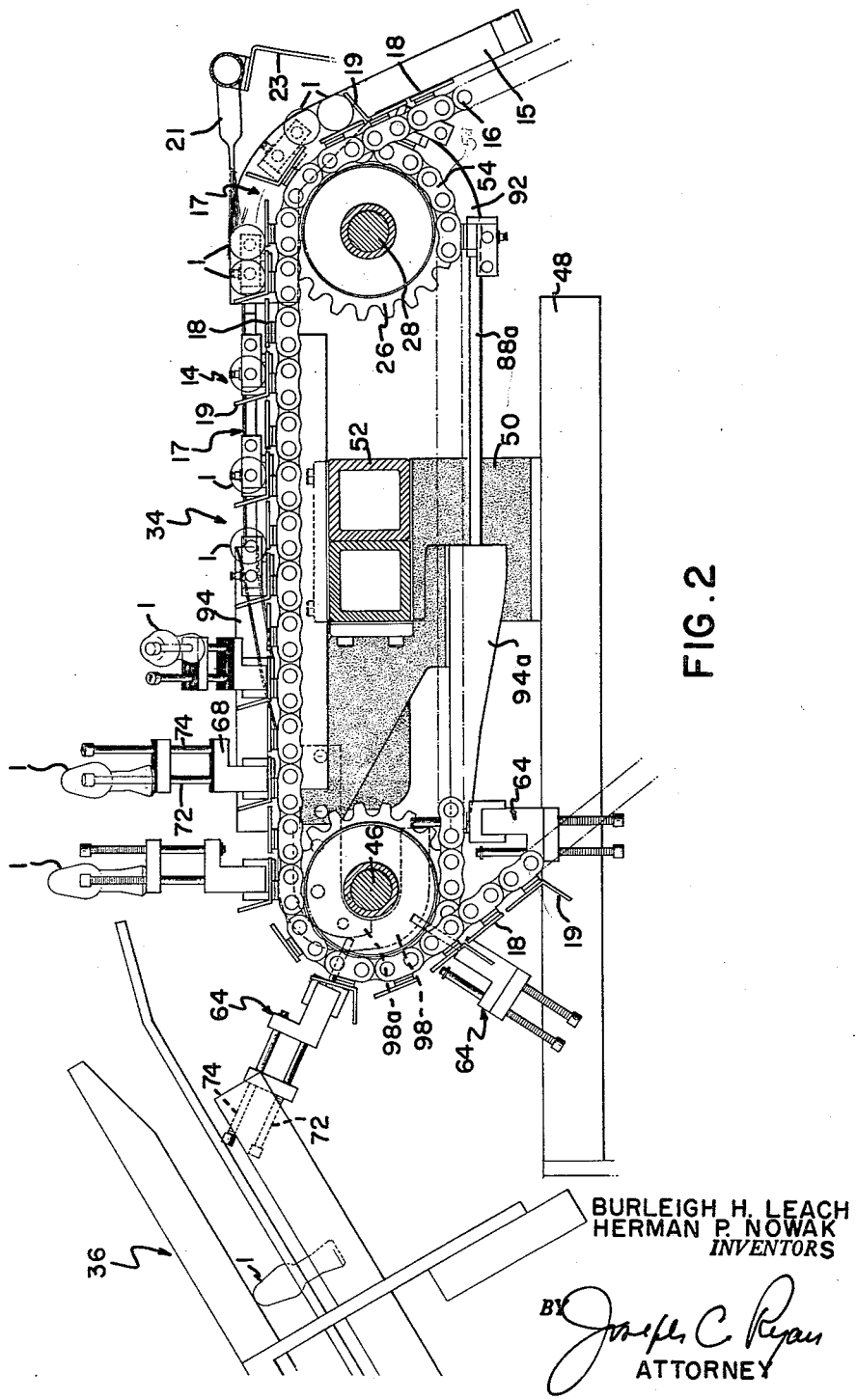
FIGURE 2 is a longitudinal sectional view through the bulb orienting apparatus.
Figure 3:
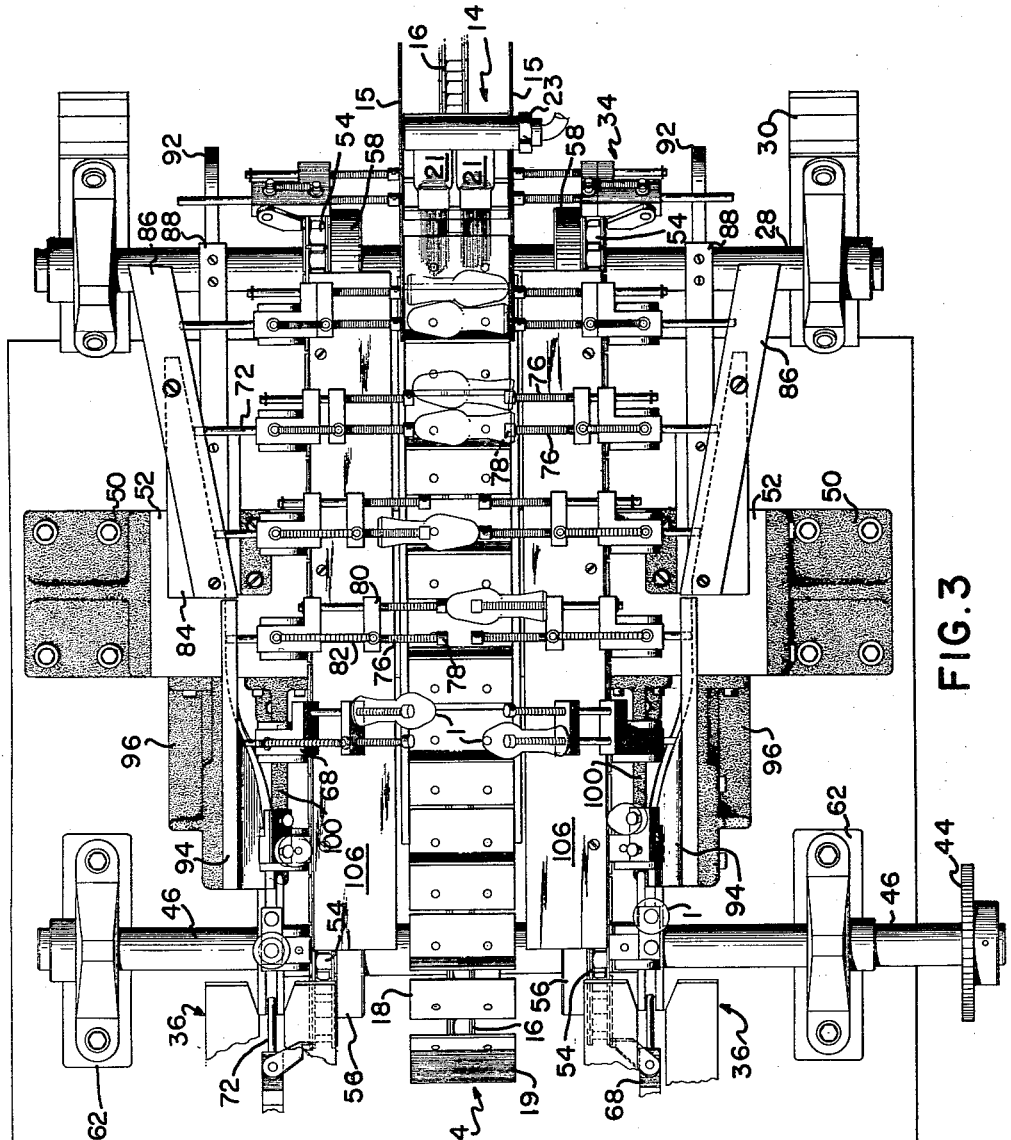
FIGURE 3 is a plan view of the bulb orienting apparatus.
Figure 4:
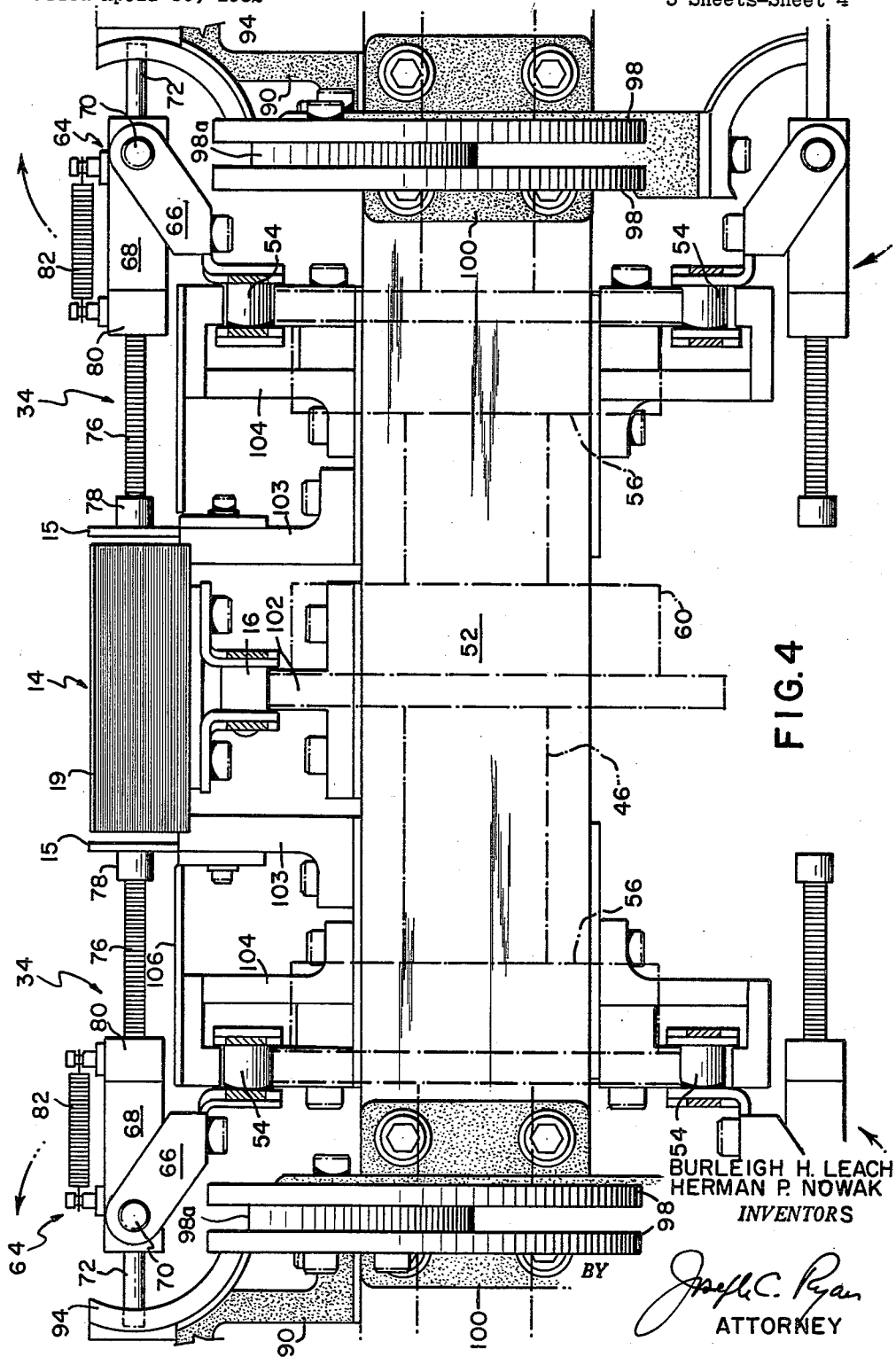
FIGURE 4 is a transverse sectional view through the bulb orienting apparatus.

The bulb orienting apparatus 34 mentioned above in connection with the description of FIG. 1 is illustrated in detail in FIGS. 2–5. Referring first to FIG. 3, it will be noted that the bulb orienting apparatus 34 comprises two similar assemblies disposed along the path traversed by the bulb conveyor 14. As is best illustrated in FIG. 2, the bulb orienting apparatus 34 is supported on a table 48 of the framework 10. This supporting structure, as shown in FIGS. 2 and 4, comprises base brackets 50 secured to the table 48 and base member 52 mounted on the base brackets 50. As illustrated particularly in FIG. 3, the bulb orienting apparatus 34 comprises a pair of conveyor chains 54 disposed parallel to and spaced from one another with the bulb conveyor 14 moving therebetween and in synchronism therewith. Each of the conveyor chains 54 meshes with a sprocket 56 on the drive shaft 46 and a sprocket 58 on the idler shaft 28. The drive shaft 46 is also provided with a sprocket 60 with which the conveyor chain 16 meshes. The drive shaft 46 is supported in pillow blocks 62 mounted on the table 48. As is best illustrated in FIG. 4, each conveyor chain 54 of the bulb orienting apparatus 34 has a plurality of bulb orienting heads 64 mounted thereon in spaced relationship. Each bulb orienting head 64 comprises a saddle 66 attached to a conveyor chain 54 and a block 68 pivotally supported on a pin 70 in the saddle 66. A long finger 72 and a short finger 74 are slidably supported in the block 68. Each of the fingers 72 and 74 is provided with a spring extension 76 having a rubber tip 78 on the free end thereof. The fingers 72 and 74 are connected to one another by a plate 80 secured thereto. As is best illustrated in FIGS. 3 and 4, a spring 82 connects the block 68 to the plate 80 and maintains the bulb orienting head 64 in a normally retracted position. It will also be noted in these two figures of the drawings that the long finger 72 extends a considerable distance rearwardly of the block 68 within which it is slidably disposed. As the bulb conveyor 14 advances, the bulbs 1 carried thereby from right to left as viewed in FIG. 3, are oriented by the bulb orienting heads 64. The means employed to effect this bulb orienting operation will now be described.

Basically there are two operations performed in effecting this bulb orienting operation. The first operation involves advancement of the fingers 72 and 74 of the bulb orienting heads toward the bulbs on the bulb conveyor 14 to effect insertion of the spring extensions of these fingers into the bulbs. The second operation involves displacing the bulb orienting heads 64 from a substantially horizontal position to a substantially vertical position to thereby orient the bulbs vertically for release to the track system 36 as shown in FIGS. 1 and 2. This first mentioned operation is effected by a bar cam 84 which is disposed between and attached to bar cam plates 86 and 88, the former being the upper and the latter being the lower. The bar cam 84 and the bar cam plates 86 and 88 are attached to a bracket 90 mounted on the base member 52. The outer end of the bar cam plate 88 is attached to the upper end of a crescent-shaped end plate 92. The lower end of this crescent-shaped end plate 92 has a similar bar cam plate connected thereto which is in turn supported by and from the base member 52.

Displacement of the bulb orienting heads 64 with bulbs 1 thereon from a substantially horizontal position to a substantially vertical position is effected by helical cams 94. Each helical cam 94 is attached to a supporting bracket 96 mounted on the base member 52. After the heads 64 with the bulbs 1 thereon have been so displaced by the helical cams 94, the long finger 72 of each bulb orienting head 64 moves along the center rail 98a of a curved cam track 98 which is mounted on a supporting bracket 100 attached to the base member 52.

As is best illustrated in FIG. 4, the bulb conveyor chain 16 rides on a chain track 102 mounted on the base member 52. A pair of rails 103 are mounted on the base member 52 astride the chain track 102 and the bulb supports 18 and 19 ride thereon. Each of the bulb orienting head conveyor chains 54 moves through a chain housing 104 attached to the base member 52. This arrangement insures the proper relative disposition in a horizontal plane of the bulb supports 18 and 19 on the bulb conveyor 14 on the one hand and the fingers 72 and 74 of the bulb orienting head 64 on their conveyor chains 54 on the other hand. Protective cover plates 106 overlie the chain housings 104.

The operation of the apparatus of our invention will now be described, reference being made initially to FIG. 1. The bulb conveyor 14, driven by the motor 40 through the drive chain 42, moves upwardly through the bulb bin 12. During this upward travel of the bulb conveyor 14 through the bin 12, the force exerted by the mass of bulbs in the bin causes some of the bulbs to locate themselves on the bulb supports 18 and 19 of the bulb conveyor 14. Suitable deflector fingers 13, one of which is shown in FIG. 1, are disposed near the mouth of the bin 12 and overlie the path traversed by the bulb conveyor 14 so that only the bulbs 1 which are disposed horizontally on the bulb supports 18 and 19 will be carried upwardly, the remainder of the bulbs being deflected back into the bin. As is shown in FIGS. 1–4, bulb guides 15 are disposed astride the path traversed by the conveyor 14 and thus insure the proper lateral disposition of the bulbs 1 on the bulb supports 18 and 19 of the bulb conveyor 14. As best illustrated in FIG. 2, the bulb supports 18 and 19 are disposed alternately on the conveyor chain 16 so that pairs of bulbs 1 are disposed in pockets or compartments 17 defined by the angle iron bulb supports 19. As the bulb conveyor 14 moves upwardly from the bulb bin 12, gravity causes the pair of bulbs 1 in each pocket 17 to be disposed at the rearward end thereof with the lower or rearward bulb supported by the angle iron bulb support of the next succeeding pocket. However, as the conveyor 14 moves over the sprocket 26 and into the area of the bulb orienting apparatus 34, the inclined disposition of the latter as best shown in FIG. 1 causes the pairs of bulbs in the pockets 17 to move to the forward end thereof. A pair of air jets 21, mounted on an arm 23 attached to framework 10, discharge compressed air and insure the displacement of the bulbs 1 to the forward end of the pockets 17 to insure their alignment with the bulb orienting heads 64 of the bulb orienting apparatus 34 as best shown in FIGS. 2 and 3. With the pairs of bulbs 1 now properly disposed in the pockets 17 of the bulb conveyor 14 they are now ready for the bulb orienting operation to be performed thereon.

The pair of conveyor chains 54 of the bulb orienting apparatus 34 are driven synchronously with the bulb conveyor chain 16 by the motor 40 through the drive chain 42 as shown in FIG. 1. Thus the bulb orienting heads 64 of the bulb orienting apparatus 34 travel with the bulb supports 18 and 19 of the bulb conveyor chain 16 during the bulb orienting operation. As best shown in FIG. 3, the first phase of the bulb orienting operation is the advancement toward one another of a pair of bulb orienting heads 64 disposed opposite one another with one or two bulbs 1 in a pocket 17 located therebetween. This advancement of the bulb orienting heads 64 toward one another is effected by the inclined bar cams 84 along which the long fingers 72 of the bulb orienting heads 64 ride. Since no effort is made to insure uniform orientation of the bulbs 1 in the pockets 17 insofar as the relative location of the head and the skirt of each bulb is concerned, the orentation in this respect of a pair of bulbs in a pocket 17 may be uniform or non-uniform. The bulb orienting apparatus 34 of our invention is designed to accommodate both circumstances. As the fingers 72 and 74 of the opposing pair of bulb orienting heads 64 move toward one another, the spring extension 76 and the tip 78 of each finger will either engage the head of a bulb or move into the bulb through the open skirt thereof. In either case, a spring extension 76 of a finger 72 or 74 is caused to move into each bulb 1 a distance sufficient to permit the finger to lift the bulb from the bulb conveyor 14 when it is properly actuated. The helical cams 94 constitute this means and the next phase of the bulb orienting operation is to cause the bulb orienting heads 64 to be displaced from a substantially horizontal position to a substantially vertical position with bulbs 1 supported thereon.

Figure 5:
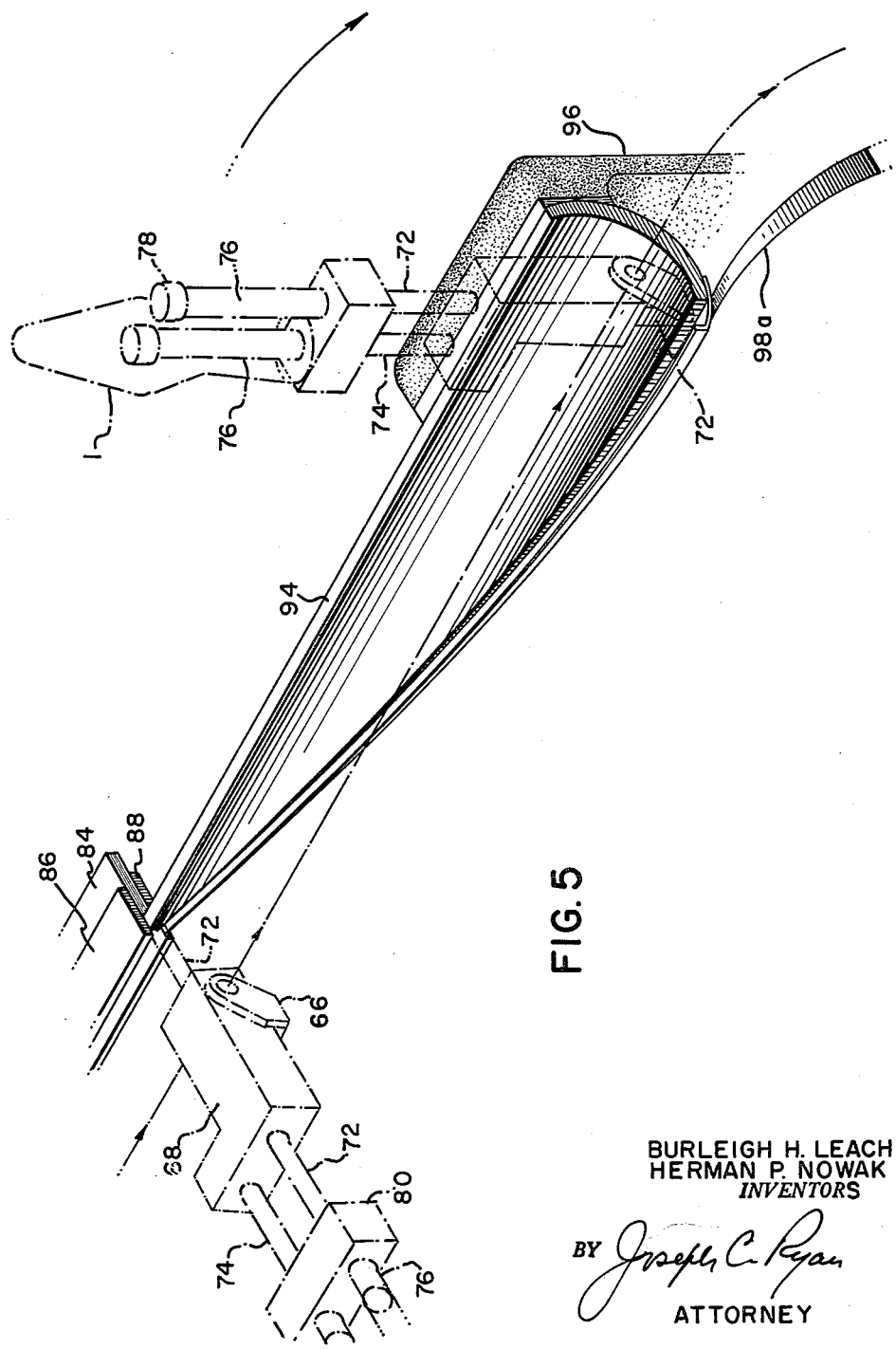
FIGURE 5 is a detail on an enlarged scale of one of the helical cams of the bulb orienting apparatus, with one of the bulb orienting heads shown in phantom and illustrating particularly the change in orientation thereof effected by the cam.

As the bulb orienting heads 64 move past the stationary helical cams 94, the rearwardly extending long finger 72 of each of the heads 64 is displaced. As best shown in FIGS. 4 and 5, the long finger 72 of each bulb orienting head 64 is displaced downwardly by the helical cam 94 thus causing the block 68 to rotate about its pivot pin 70 and thus effect elevation of the heads 64 from the horizontal to the vertical position.

With the bulb orienting heads 64 now disposed vertically and supporting one or two bulbs 1 thereon, the continuing movement of the conveyor chains 54 carries the heads 64 to a discharge locus where the bulbs 1 are delivered to the track system 36 as best illustrated in FIGS. 1 and 2. As each vertically disposed bulb orienting head 64 approaches the discharge locus, the long finger 72 depending therefrom rides along the center rail 98a of the curved cam track 98 and, as the conveyor chain 54 moves over the sprocket 56, the bulb 1 is deposited on the track system 36 and the bulb orienting head 64 is disengaged therefrom. As noted above, bulbs 1 emerging from the track system 36 are received by another unit of bulb processing or lamp manufacturing equipment such as the bulb conveyor system 38 shown in FIG. 1 for example.

Disengagement of the fingers 72 and 74 from the bulbs 1 during delivery of the bulbs 1 to the track system 36 is aided by a partial retraction of the fingers 72 and 74 as the chains 54 move over the sprockets 56 and the fingers 72 follow the contour of the center rail 98a of the curved cam track 98 as shown in FIGURE 2 for example. As shown in FIGURE 2, the center rail 98a curves inwardly somewhat and thus permits some retraction of the longer finger 72 driven by the spring 82 which, as shown in FIGURE 3, was extended during the initial phase of the operation of the bulb orienting apparatus 34. As soon as the head 64 moves beyond the center rail 98a of the curved cam track 98 so that the long finger 72 is no longer in engagement therewith, the spring 82 completes the return of the fingers 72 and 74 to their normal rest position. A helical cam 94a, similar to helical cam 94 described above, is located along the path traversed by the heads 64 as they return to their normal starting position as shown in FIG. 2. The helical cam 94a effects the return of the bulb orienting heads 64 from a substantially vertical to a substantially horizontal position. Immediately thereafter, the long finger 72 engages and rides along a bar cam plate 88a which serves to maintain the bulb orienting head 64 substantially horizontal. As each conveyor chain 54 moves over a sprocket 58 carrying a bulb orienting head 64 with it, the long finger 72 of the head 64 rides along the crescent-shaped end plate 92 and eventually onto bar cam plate 88 as shown in FIG. 3. This completes the return of the bulb orienting heads 64 and they are now ready for another operating cycle.

What we claim is:

1. Apparatus for effecting uniform orientation of bulbs randomly disposed in a bin, said apparatus comprising: a bulb conveyor; means for moving said bulb conveyor through a predetermined path, a portion of said path being through said randomly disposed bulbs in said bin; means for supporting bulbs substantially horizontally on said bulb conveyor; means, disposed along the path traversed by said bulb conveyor as it emerges from said bin, for deflecting from said bulb conveyor those bulbs which are not disposed horizontally thereon; a bulb orienting head conveyor disposed along at least a portion of the path traversed by said bulb conveyor; bulb orienting heads mounted on said bulb orienting head conveyor; means for driving said bulb orienting head conveyor in synchronism with said bulb conveyor; and means for actuating said bulb orienting heads during the synchronous travel of said bulb conveyor and said bulb orienting head conveyor whereby said bulb orienting heads lift the horizontally disposed bulbs from said bulb conveyor and support them in a substantially vertical disposition.

2. Apparatus for effecting uniform orientation of bulbs randomly disposed in a bin, said apparatus comprising: a bulb conveyor; means for moving said bulb conveyor through a predetermined path, a portion of said path being through said randomly disposed bulbs in said bin; means for supporting bulbs substantially horizontally on said bulb conveyor; means, disposed along the path traversed by said bulb conveyor as it emerges from said bin, for deflecting from said bulb conveyor those bulbs which are not disposed horizontally thereon; a bulb orienting head conveyor disposed along at least a portion of the path traversed by said bulb conveyor; bulb orienting heads mounted on said bulb orienting head conveyor; means for driving said bulb orienting head conveyor in synchronism with said bulb conveyor; means for actuating said bulb orienting heads during the synchronous travel of said bulb conveyor and said bulb orienting head conveyor whereby said bulb orienting heads lift the horizontally disposed bulbs from said bulb conveyor and support them in a substantially vertical disposition; and means for discharging said vertically disposed bulbs from said bulb orienting heads.

3. Bulb orienting apparatus comprising: a bulb conveyor; means for supporting bulbs substantially horizontally on said bulb conveyor; a bulb orienting head conveyor disposed along each side of at least a portion of the path traversed by said bulb conveyor; bulb orienting heads, including fingers projecting therefrom, mounted on each of said bulb orienting head conveyors; means for driving said bulb conveyor and said bulb orienting head conveyors in synchronism; means disposed along the paths traversed by said bulb orienting head conveyors for advancing the fingers of the heads on each of said bulb orienting head conveyors toward one another whereby some of said fingers are advanced into the bulbs on said bulb conveyor and others of said fingers displace said bulbs along their longitudinal axes on said bulb conveyor whereby a further penetration into said bulbs by said first mentioned group of fingers is effected; and means for displacing said fingers of said bulb orienting heads in a vertical plane whereby bulbs into which said fingers have penetrated are removed from said bulb conveyor and caused to assume a substantially vertical disposition.

4. Bulb orienting apparatus comprising: a bulb conveyor; means for supporting bulbs substantially horizontally on said bulb conveyor; a bulb orienting head conveyor disposed along each side of at least a portion of the path traversed by said bulb conveyor; bulb orienting heads, including fingers projecting therefrom, mounted on each of said bulb orienting head conveyors; means for driving said bulb conveyor and said bulb orienting head conveyors in synchronism; means disposed along the paths traversed by said bulb orienting head conveyors for advancing the fingers of the heads on each of said bulb orienting head conveyors toward one another whereby some of said fingers are advanced into the bulbs on said bulb conveyor and others of said fingers displace said bulbs along their longitudinal axes on said bulb conveyor whereby a further penetration into said bulbs by said first mentioned group of fingers is effected; means for displacing said fingers of said bulb orienting heads in a vertical plane whereby bulbs into which said fingers have penetrated are removed from said bulb conveyor and caused to assume a substantially vertical disposition; and means for discharging said vertically disposed bulbs from said fingers.

5. Apparatus for effecting uniform orientation of bulbs randomly disposed in a bin, said apparatus comprising: a bulb conveyor; means for moving said bulb conveyor through a predetermined path, a portion of said path being through said randomly disposed bulbs in said bin; means for supporting bulbs substantially horizontally on said bulb conveyor; means, disposed along the path traversed by said bulb conveyor as it emerges from said bin, for deflecting from said bulb conveyor those bulbs which are not disposed horizontally thereon; a bulb orienting head conveyor disposed along each side of at least a portion of the path traversed by said bulb conveyor; bulb orienting heads mounted on each of said bulb orienting head conveyors; means for driving said bulb orienting head conveyors in synchronism with said bulb conveyor; and means for actuating said bulb orienting heads during the synchronous travel of said bulb conveyor and said bulb orienting head conveyors whereby said bulb orienting heads lift the horizontally disposed bulbs from said bulb conveyor and support them in a substantially vertical disposition.

6. Apparatus for orienting bulbs having a closed head and an open skirt, said apparatus comprising: a bulb conveyor; means on said bulb conveyor defining pockets for receiving pairs of bulbs disposed horizontally and with the major axis of each said bulb being substantially normal to the path traversed by said bulb conveyor, but randomly oriented insofar as the relative location of the heads and skirts of the bulbs in each pair are concerned; a bulb orienting conveyor disposed substantially parallel to and along each side of at least a portion of the path traversed by said bulb conveyor; a plurality of bulb orienting heads mounted on each of said bulb orienting conveyors, each of said heads on one of said conveyors being disposed opposite and in alignment with a bulb orienting head on the other of said conveyors, and said paired bulb orienting heads being aligned with a pocket of said bulb conveyor disposed therebetween, each of said bulb orienting heads including a pair of substantially parallel fingers, normally disposed substantially horizontally, and the pair of fingers of each head on one of said bulb orienting conveyors being aligned axially with the pair of fingers of the paired head on the other of said bulb orienting conveyors, the axes of said fingers being substantially coincident with the major axes of said bulbs in each of said pockets of said bulb conveyor; means for driving said bulb conveyor and said pair of bulb orienting conveyors in synchronism; means disposed along the path traversed by said bulb orienting conveyors for advancing the pairs of fingers of the paired heads toward one another whereby two of said fingers enter said bulbs through the open skirts thereof and the other two of said fingers engage the heads of said bulbs and displace said bulbs laterally on said bulb conveyor to insure substantial penetration of said bulbs by the fingers through the open skirts thereof; means disposed along the path traversed by said bulb orienting conveyors for subsequently displacing said bulb orienting heads in a vertical plane whereby the normally horizontally disposed fingers which have penetrated the bulbs lift the bulbs from the bulb conveyor and support them with their major axes substantially vertical; and means for subsequently discharging said vertically disposed bulbs from said fingers.

References Cited in the file of this patent

UNITED STATES PATENTS 2,355,597    Pond ------------------ Aug. 8, 1944